(12) United States Patent
Roberts et al.

(10) Patent No.: US 12,065,095 B2
(45) Date of Patent: Aug. 20, 2024

(54) SENSING THE INGRESS OF WATER INTO A VEHICLE

(71) Applicants: Toyota Connected North America, Inc., Plano, TX (US); Toyota Motor North America, Inc., Plano, TX (US)

(72) Inventors: Simon P. Roberts, Celina, TX (US); Yang Ding, Montreal (CA); Daniel W. Reaser, Oak Point, TX (US); Christopher J. Macpherson, Plano, TX (US); Keaton Khonsari, Dallas, TX (US); Derek A. Thompson, Dallas, TX (US); Sergei I. Gage, Redford, MI (US)

(73) Assignees: Toyota Connected North America, Inc., Plano, TX (US); Toyota Motor North America, Inc., Plano, TX (US)

( * ) Notice: Subject to any disclaimer, the term of this patent is extended or adjusted under 35 U.S.C. 154(b) by 267 days.

(21) Appl. No.: 17/341,802

(22) Filed: Jun. 8, 2021

(65) Prior Publication Data

US 2022/0388464 A1 Dec. 8, 2022

(51) Int. Cl.
*B60R 22/00* (2006.01)
*B60Q 9/00* (2006.01)
(Continued)

(52) U.S. Cl.
CPC .......... *B60R 21/01512* (2014.10); *B60Q 9/00* (2013.01); *B60R 21/01554* (2014.10); *B60R 21/01556* (2014.10); *B60R 22/322* (2013.01); *B60R 2021/0016* (2013.01); *B60R 2021/0027* (2013.01); *B60R 2021/0032* (2013.01); *B60R 2021/01088* (2013.01); *B60Y 2400/3019* (2013.01)

(58) Field of Classification Search
CPC ........ B60R 21/01512; B60R 21/01554; B60R 21/01556; B60R 22/322; B60R 2021/0016; B60R 2021/0027; B60R 2021/0032; B60R 2021/01088; B60Q 9/00; B60Y 2400/3019
See application file for complete search history.

(56) References Cited

U.S. PATENT DOCUMENTS 5,361,070 A 11/1994 McEwan
7,401,807 B2 7/2008 Breed et al.
(Continued)

OTHER PUBLICATIONS

Alizadeh et al., "Low-cost Low-Power in-Vehicle Occupant Detection with mm-wave FMCW radar," 2019 IEEE Sensors, 2019, pp. 1-4, doi: 10.1109/Sensors43011.2019.8956880,arXiv:1908.04417v1 [eess.SP] Aug. 12, 2019.
(Continued)

*Primary Examiner* — Adam M Alharbi
(74) *Attorney, Agent, or Firm* — Christopher G. Darrow; Darrow Mustafa PC

(57) ABSTRACT

Systems, methods, and other embodiments described herein relate to sensing ingress of water in a vehicle. In one embodiment, a method includes acquiring, from a radar of a vehicle, radar data about a passenger cabin of the vehicle. The method includes determining a current state of the passenger cabin according to the radar data. The method includes, responsive to identifying that the current state indicates an ingress of water into the passenger cabin, generating a response to the ingress of the water.

17 Claims, 5 Drawing Sheets

(51) Int. Cl.
 *B60R 21/015* (2006.01)
 *B60R 22/32* (2006.01)
 *B60R 21/00* (2006.01)
 *B60R 21/01* (2006.01)

(56) References Cited

U.S. PATENT DOCUMENTS

| | | | |
|---|---|---|---|
| 9,102,220 | B2 | 8/2015 | Breed |
| 9,865,150 | B2 | 1/2018 | Brankovic et al. |
| 10,159,735 | B2 | 12/2018 | Friedman et al. |
| 10,503,985 | B2 | 12/2019 | Gokan et al. |
| 10,754,021 | B2 | 8/2020 | Baheti et al. |
| 10,761,187 | B2 * | 9/2020 | Santra .................... G01S 7/282 |
| 10,875,468 | B2 | 12/2020 | Saito et al. |
| 11,485,254 | B2 * | 11/2022 | Christensen ....... B60N 2/42736 |
| 2006/0025897 | A1 * | 2/2006 | Shostak ................ G08G 1/017 |
| | | | 701/1 |
| 2008/0047329 | A1 * | 2/2008 | Breed .............. G01N 35/00871 |
| | | | 73/61.41 |
| 2015/0061895 | A1 * | 3/2015 | Ricci ..................... G06V 40/28 |
| | | | 340/902 |
| 2018/0229688 | A1 * | 8/2018 | Farooq ................. B60R 22/322 |
| 2019/0392697 | A1 | 12/2019 | Perez Barrera et al. |

OTHER PUBLICATIONS

Steinhauer et al., "Millimeter-Wave-Radar Sensor Based on a Transceiver Array for Automotive Applications." IEEE Transactions on Microwave Theory and Techniques 56 (2008): 261-269.

Baird et al., "Principal Component Analysis-Based Occupancy Detection with Ultra Wideband Radar," 2017 IEEE 60th International Midwest Symposium on Circuits and Systems (MWSCAS), 2017, pp. 1573-1576, doi: 10.1109/MWSCAS.2017.8053237.

* cited by examiner

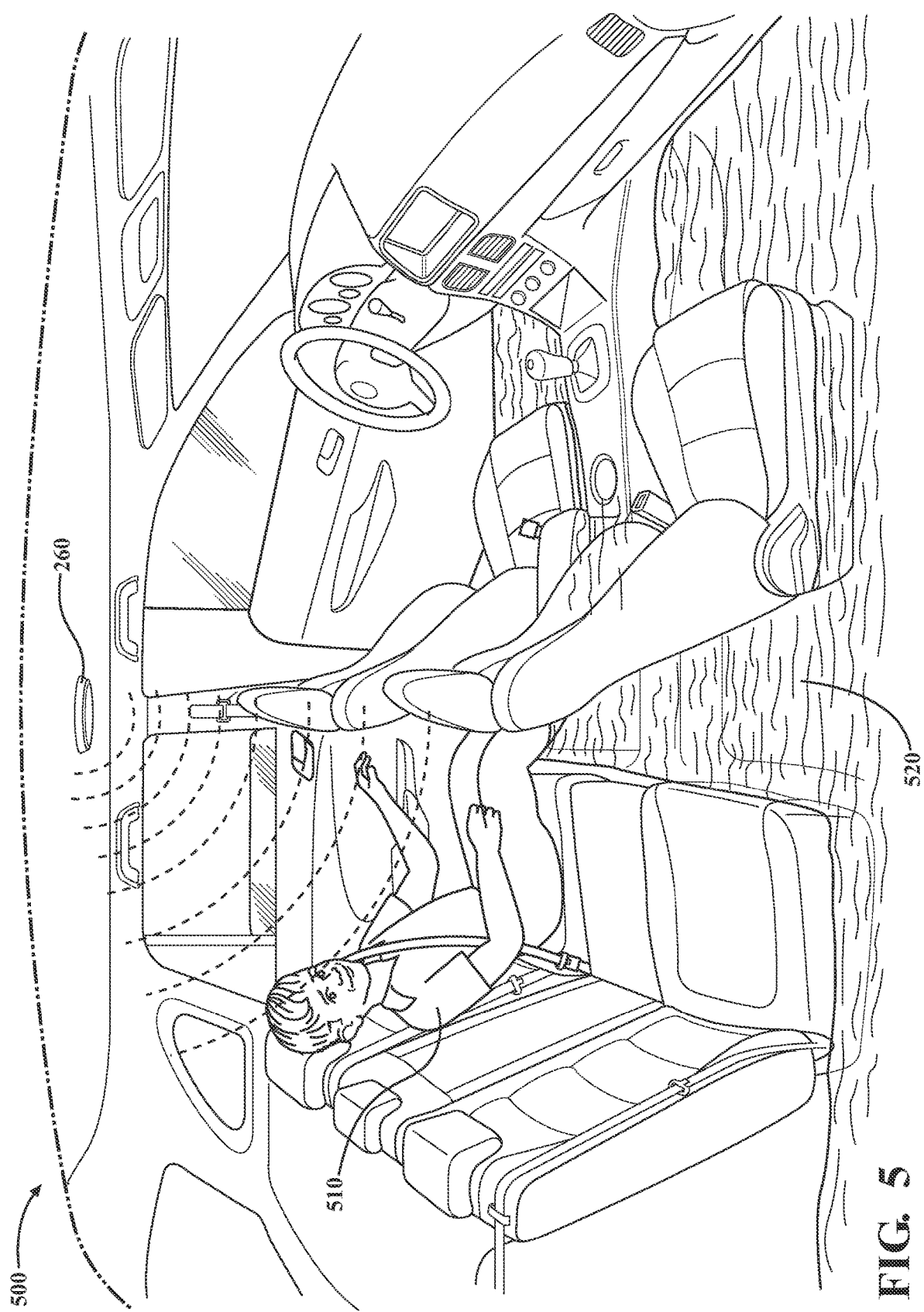

SENSING THE INGRESS OF WATER INTO A VEHICLE

TECHNICAL FIELD

The subject matter described herein relates, in general, to systems and methods for sensing the ingress of water into a vehicle and, more particularly, to sensing when a vehicle may be submerged and facilitating a response to help a passenger.

BACKGROUND

Vehicles may employ various safety systems to protect passengers, such as airbags, active/passive restraints, automated control assistance (e.g., anti-lock braking systems (ABS)), door locks, and so on. While these systems improve the safety of the passengers, they do not extend to all circumstances that a vehicle may encounter and can, in some situations, cause increased risks. For example, when a vehicle encounters water and becomes submerged, a restraint (e.g., a seatbelt) and door locks can hinder the safety of the passenger by preventing exit from the vehicle in a quick and simple manner. Moreover, emergency services responding to a submerged vehicle may not be aware of an exact location, how many passengers are in the vehicle, and so on, thereby potentially frustrating a rescue effort. Accordingly, safely handling an occurrence of a submerged vehicle can present unique difficulties.

SUMMARY

Embodiments include systems and methods that relate to improving the safety of vehicle passengers by sensing the ingress of water. As previously noted, the use of various safety systems can complicate the safe exit from a vehicle that is submerged. Moreover, the rescue of passengers within a submerged vehicle or a vehicle that is sinking can also be a complex operation for emergency services. For example, passengers trying to exit a vehicle that is submerged may have difficulties quickly unlatching seatbelts and opening doors or windows. That is, because of the confusion that can occur when water is flooding into the vehicle a passenger may not be able to unlatch a seatbelt. Moreover, as pressure differentials arise pushing against the outside of a door, many passengers are not likely able to open the door because of the additional force. Further, as the vehicle can quickly lose power, electronic window controls may not function, thereby trapping a passenger within the vehicle. Furthermore, because the location of a submerged vehicle is often not immediately apparent, and how many passengers are in the vehicle is generally unknown, effectively locating and rescuing the passengers can be a complex matter.

Accordingly, in one embodiment, an approach to improving a response when a vehicle encounters the ingress of water is disclosed. In one configuration, a monitoring system uses sensors of the vehicle and, specifically, sensors within the passenger cabin of the vehicle to monitor a current state. The monitoring system can employ sensors, such as millimeter-wave (MMW) radar, to sense various aspects about the current state, including the presence of the water and the extent to which the water has ingressed and continues to ingress into the passenger cabin. To determine the ingress of water, the monitoring system can analyze radar data to identify a signature of the water (e.g., an increased density in comparison to air) and can further identify how far the water has risen within the vehicle. The monitoring system may implement a threshold determination, such as sensing water that is at least one inch deep through the floor area of the vehicle 100 prior to indicating the ingress of water. This thresholding may prevent false alerts from spilled water, rain, or other non-emergency sources that may occur within the vehicle.

Furthermore, the monitoring system can also derive, as part of determining the current state, further information about the passenger cabin. The further information can include whether passengers are present in the passenger cabin, a number of passengers that are present, locations of passengers that are present, a current condition of the passengers (e.g., breathing, etc.), and so on. The monitoring system can further aggregate additional information about the vehicle and circumstances surrounding the vehicle encountering the water, such as a location of the vehicle at the time of encountering the water, a speed and direction of the vehicle when entering the water, and so on.

Using the observations from the sensors, the monitoring system can perform various tasks in support of the safety of the passengers. For example, the monitoring system, responsive to identifying the ingress of water into the passenger cabin, can control the vehicle to perform actions that improve the safety of the passengers, such as unlocking a door, opening a window, unlatching a seatbelt, closing vents to slow the progress of water, and so on. In still further aspects, because the timing of a rescue from a vehicle that is sinking or is submerged can be of critical importance, the monitoring system can transmit a communication alerting emergency services about the condition of the vehicle. That is, the monitoring system can communicate an alert that indicates the vehicle is in water and that water is presently ingressing. In addition to the basic message, the monitoring system can generate the message to include additional information, including a GPS location, the presence of passengers, the number of passengers, the condition of the passengers, and so on. In this way, the monitoring system can facilitate the rescue and safety of the passengers during an emergency event involving water ingressing into the vehicle.

In one embodiment, a monitoring system for improving safety of vehicle passengers by sensing the ingress of water is disclosed. The monitoring system includes a processor and a memory storing instructions that, when executed by the processor, cause the processor to perform various functions. The instructions including instructions to acquire, from a radar of a vehicle, radar data about a passenger cabin of the vehicle. The instructions including instructions to determine a current state of the passenger cabin according to the radar data. The instructions including instructions to, responsive to identifying that the current state indicates an ingress of water into the passenger cabin, generate a response to the ingress of the water.

In one embodiment, a non-transitory computer-readable medium including instructions that, when executed by one or more processors, cause the one or more processors to perform various functions is disclosed. The instructions include instructions to acquire, from a radar of a vehicle, radar data about a passenger cabin of the vehicle. The instructions including instructions to determine a current state of the passenger cabin according to the radar data. The instructions including instructions to, responsive to identifying that the current state indicates an ingress of water into the passenger cabin, generate a response to the ingress of the water.

In one embodiment, a method is disclosed. In one embodiment, the method includes acquiring, from a radar of a vehicle, radar data about a passenger cabin of the vehicle. The method includes determining a current state of the passenger cabin according to the radar data. The method includes, responsive to identifying that the current state indicates an ingress of water into the passenger cabin, generating a response to the ingress of the water.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 5 is an illustration depicting a passenger within a vehicle that is sinking in water.

DETAILED DESCRIPTION

Figure 1:
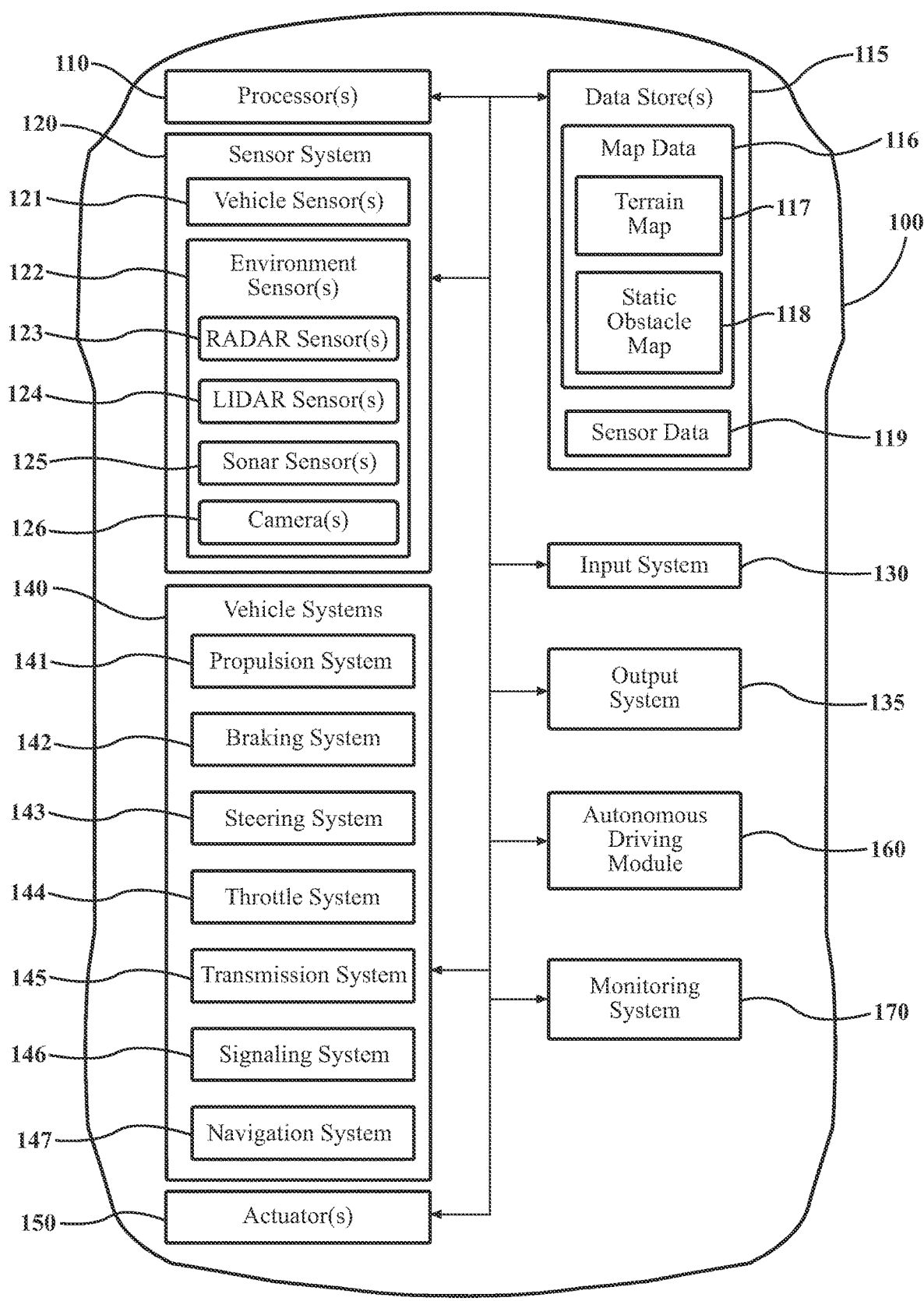
FIG. 1 illustrates one embodiment of a vehicle within which systems and methods disclosed herein may be implemented.

Systems, methods, and other embodiments associated with improving the safety of vehicle passengers by sensing the ingress of water are disclosed. As previously noted, the use of various safety systems can complicate the safe exit from a vehicle that is submerged, or that is taking on water. Moreover, the rescue of the passengers within a submerged vehicle or a vehicle that is sinking can also be a complex operation for emergency services. For example, passengers trying to exit a vehicle that is submerged may have difficulties quickly unlatching seatbelts and opening doors or windows. That is, because of the confusion that can occur when water is flooding into the vehicle, a passenger may not be able to unlatch a seatbelt. Moreover, as pressure differentials arise pushing against the outside of a door, many passengers are not likely able to open the door because of the additional force. Further, as the vehicle can quickly lose power, electronic window controls may not function, thereby trapping a passenger within the vehicle. Furthermore, because the location of a submerged vehicle is often not immediately apparent, and how many passengers are in the vehicle is generally unknown, effectively locating and rescuing the passengers can be a complex matter.

Accordingly, in one embodiment, an approach to improving a response when a vehicle encounters the ingress of water is disclosed. In one configuration, a monitoring system uses sensors of the vehicle and, specifically, sensors within the passenger cabin of the vehicle to monitor a current state of the passenger cabin. The monitoring system can employ sensors, such as millimeter-wave (MMW) radar, to sense various aspects about the current state, including the presence of the water and the extent to which the water has ingressed and continues to ingress into the passenger cabin. To determine the ingress of water, the monitoring system can analyze radar data from the radar to identify a signature of the water (e.g., areas having an increased density in comparison to air) and can further identify how far the water has risen within the vehicle. The monitoring system may implement a threshold determination, such as sensing water that is at least one inch deep through the floor area of the vehicle 100 prior to indicating the ingress of water. This thresholding may prevent false alerts from spilled water, rain, or other non-emergency sources that may occur within the vehicle.

Furthermore, the monitoring system can also derive, as part of determining the current state, further information about the passenger cabin. The further information can include whether passengers are present in the passenger cabin, a number of passengers that are present, locations of passengers that are present, a current condition of the passengers (e.g., breathing, etc.), and so on. The monitoring system can further aggregate additional information about the vehicle and circumstances surrounding the vehicle encountering the water, such as a location of the vehicle at the time of encountering the water, a speed and direction of the vehicle when entering the water, and so on.

Using the observations from the sensors, the monitoring system can perform various tasks in support of the safety of the passengers. For example, the monitoring system, responsive to identifying the ingress of water into the passenger cabin, can control the vehicle to perform actions that improve the safety of the passengers, such as unlocking a door, opening a window, unlatching a seatbelt, closing vents to slow the progress of water into the vehicle, and so on. In still further aspects, because the timing of a rescue from a vehicle that is sinking or is submerged can be of critical importance, the monitoring system can transmit a communication alerting emergency services about the condition of the vehicle. That is, the monitoring system can communicate an alert that indicates the vehicle is in water and that water is presently ingressing. In addition to the basic message, the monitoring system can generate the message to include additional information, including a GPS location, the presence of passengers, the number of passengers, the condition of the passengers, and so on. In this way, the monitoring system can facilitate the rescue and safety of the passengers during an emergency event involving water ingressing into the vehicle.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that carries passengers within a defined space that is a passenger cabin. Thus, presently disclosed approaches may extend to buses, and other people-moving systems that may become submerged in water.

In any case, the vehicle 100, as described herein, also includes various elements. It will be understood that, in various embodiments, it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a monitoring system 170 that functions to improve the safety of passengers within a vehicle by sensing the ingress of water and performing various automated actions to facilitate egress of the passengers and rescue from the vehicle 100. The noted functions and methods will become more apparent with a further discussion of the figures.

Figure 2:
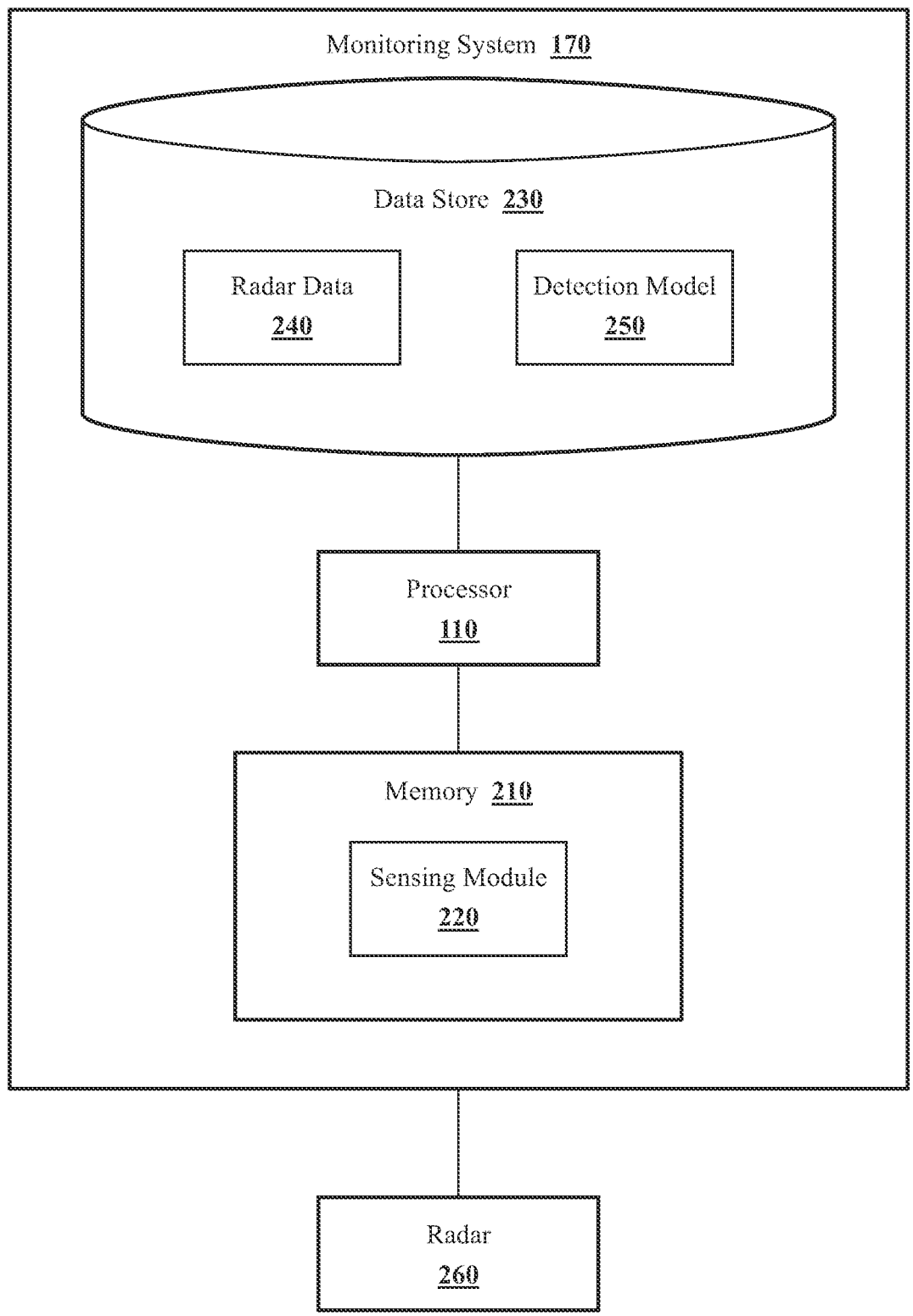
FIG. 2 illustrates one embodiment of a monitoring system that is associated with sensing water within a vehicle.

With reference to FIG. 2, one embodiment of the monitoring system 170 is further illustrated. The monitoring system 170 is shown as including a processor 110. Accordingly, the processor 110 may be a part of the monitoring system 170, or the monitoring system 170 may access the processor 110 through a data bus or another communication path. In one or more embodiments, the processor 110 is an application-specific integrated circuit (ASIC) that is configured to implement functions associated with a sensing module 220. In general, the processor 110 is an electronic processor, such as a microprocessor, that is capable of performing various functions, as described herein. In one embodiment, the monitoring system 170 includes a memory 210 that stores the sensing module 220. The memory 210 is a random-access memory (RAM), read-only memory (ROM), a hard disk drive, a flash memory, or another suitable memory for storing the module 220. The module 220 is, for example, computer-readable instructions that, when executed by the processor 110, cause the processor 110 to perform the various functions disclosed herein. Of course, the module 220, in an alternative approach, includes hardware logic, a programmable logic array, or another hardware-based processing system that implements the instructions in a physical form.

Furthermore, in one embodiment, the monitoring system 170 includes a data store 230. The data store 230 is, in one arrangement, an electronic data structure, such as a database that is stored in the memory 210 or another memory and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes radar data 240 and a detection model 250 along with, for example, other information that is used by the module 220.

With continued reference to FIG. 2, the sensing module 220 generally includes instructions that function to control the processor 110 to acquire the radar data 240 about a passenger cabin of the vehicle 100 from a radar 260 within the vehicle 100. Accordingly, the sensing module 220, in one embodiment, controls at least one radar 260 within the vehicle 100 to provide the radar data 240. In further embodiments, the sensing module 220 may acquire information from further sensors in addition to the radar 260, such as cameras, ultrasonic sensors, and so on. For example, the sensing module 220, in one approach, fuses data from separate sensors to provide an observation about a particular aspect of the passenger cabin of the vehicle 100. By way of example, the sensor data itself, in one or more approaches, may take the form of separate images, radar returns (i.e., radar data 240), LiDAR returns, telematics data, and so on. Generally, the sensing module 220 derives determinations (e.g., location, movement, size, etc.) from the acquired sensor data and fuses the data for separate aspects of the observed space with corresponding information.

Of course, while multiple sources are mentioned, the sensing module 220 may rely on the radar data 240 alone to sense the water within the passenger cabin and to provide observations about other aspects about passengers in the vehicle 100 and associated vehicle components. Additionally, while the sensing module 220 is discussed as controlling the various sensors to provide the sensor data, in one or more embodiments, the sensing module 220 can employ other techniques that are either active or passive to acquire the sensor data. For example, the sensing module 220 may passively sniff the sensor data from a stream of electronic information provided by the various sensors to further components within the vehicle 100. Moreover, while the sensing module 220 is discussed as performing the noted functions within the vehicle 100, in one or more arrangements, the sensing module 220 may be located remotely from the vehicle 100 as a cloud-based resource to process the radar data 240 and/or other acquired sensor data.

With reference to the radar 260 itself, in one arrangement, the radar 260 is a millimeter-wave (MMW) radar. Thus, the radar 260 may use electromagnetic signals having frequencies in the range of 30 to 300 GHz. In further arrangements, the radar 260 is an ultra-wideband (UWB) radar or another type of radar that provides for the functionality discussed herein. The radar 260 itself may be configured as multiple separate devices and/or with multiple antennas and/or transceivers to improve sensing a whole volume of the passenger cabin. In general, the selection of a particular type and configuration for the radar 260 is related to the functionality provided by the radar 260. For example, the radar 260 generally provides for observing areas where water may occur (e.g., floor areas) and passengers in the passenger cabin and may do so even though objects may obscure a direct line of sight. That is, the radar 260 is capable of imaging areas within the vehicle 100, including the passenger through objects or, phrased otherwise, can see through objects. For example, the sensing module 220 can focus the depth of sensing of the radar 260 within a defined space that is associated with sensing particular aspects about the passenger cabin, such as monitoring a particular passenger or sensing the ingress of water within a footwell. Thus, the radar 260 provides information about the defined space regardless of the placement of obscuring elements between the radar and the defined space. Accordingly, the radar 260 can sense the area of the defined space through obstructions, such as clothing, jackets, toys, child safety seats, vehicle seats, backpacks, and other objects. In this way, the sensing module 220 acquires information about the passenger cabin without concerns about items obstructing a view, as may occur with traditional imaging techniques (e.g., RGB cameras).

Moreover, the radar 260 provides information about separate seating areas within the passenger cabin. The separate seating areas can include rear seating areas, such as middle and back rows within a minivan or another vehicle having a multi-row seating arrangement, and back seating areas within sedans, sport utility vehicles (SUVs), and similar vehicles. As a further aspect, the radar 260 may also provide the radar data 240 about front passenger seats and, in one arrangement, even a seat for an operator of the vehicle 100. Thus, in general, the radar data 240 provides observations of areas within the passenger cabin where passengers may be seated in order to provide a complete observation of the passenger cabin. In further aspects, the radar 260 can provide information about areas extending beyond the passenger cabin. That is, for example, the radar data 240, in one or more arrangements, includes observations extending to trunk spaces, truck beds, engine compartments, frunks, and so on. In this way, the radar 260 is able to provide information that permits the sensing module 220 to provide comprehensive monitoring of interior spaces of the vehicle 100.

Additionally, the radar data 240 provides information about different types of materials. That is, the sensing module 220 can process the radar data 240 to identify characteristics about different areas observed in the passenger cabin. Where a radar signal encounters a seat, the radar data 240 may indicate a particular density of the material. Likewise, where a radar signal encounters water, the radar data 240 embodies that encounter with a particular signature that is unique to the water. Thus, the sensing module 220 can analyze the radar data 240 to identify areas within the passenger cabin that exhibit the signature of water in order to identify the presence and ingress of water into the passenger cabin.

In any case, the sensing module 220 includes instructions to acquire the radar data 240 about the passenger cabin of the vehicle 100 and, in at least one arrangement, performs initial determinations about the passenger cabin as part of determining the current state. The initial determinations may include identifying the presence of passengers in different seats and the characteristics of the passengers. For example, in one configuration, the sensing module 220 actively identifies when a passenger enters/exits the vehicle 100. Thus, the sensing module 220 may use a door sensor to identify when a passenger may be entering/exiting and perform a scan to identify the presence of a passenger and a particular location within the passenger cabin. Thus, in one arrangement, determining the presence of the passenger is an ongoing determination of a current state of the passenger cabin that functions to dynamically determine changes within the passenger cabin.

The sensing module 220 further, in one approach, determines characteristics of the passenger, including an age for the passenger. Thus, the sensing module 220 may use the radar data 240 to estimate a size of the passenger (e.g., height, volume, etc.) in order to provide an estimate of the age. In further arrangements, the sensing module 220 may leverage additional sensors in the vehicle 100 to make this assessment, such as weight sensors in the seats of the vehicle 100. In one arrangement, the sensing module 220 processes the radar data 240 using a machine learning model, such as the detection model 250. Thus, in one approach, the detection model 250 identifies clusters of associated points within a point cloud from which the detection model 250 defines a volume associated with the passenger, which may indicate a pose and various attributes of the passenger. As such, the detection model 250 can then output an estimated height and/or overall size of the passenger, which the sensing module 220 can use to generally estimate the age of the passenger.

Moreover, as part of determining the current state, the sensing module 220 can track characteristics about the passenger, such as respiration rate, to identify when the passenger is breathing and whether the passenger is experiencing distress. This may be especially applicable when the vehicle 100 encounters the ingress of water to identify when the passenger becomes incapacitated.

Accordingly, the sensing module 220 iteratively acquires the radar data 240 to determine a current state of the passenger cabin relative to passengers and aspects of the passenger cabin itself, such as the ingress of water. In one approach, the sensing module 220 identifies when the ingress of water satisfies a threshold in relation to an extent of water present in vehicle 100. The threshold may define, for example, a height of water within the passenger cabin and/or a rate of rise of the water. For example, in one arrangement, if the sensing module 220 detects the presence of water and determines a height of the water off of the floor of the vehicle 100 to be at least 2.5 cm. Determining the height of the water may also include determining an extent of the water within the passenger cabin, such as across multiple areas of the floor, in a footwell of the operator and front passenger, within a rear seating footwell area, and so on. Thus, the sensing module 220 may define the threshold to include multiple areas, such as the front footwells and/or the rear footwells, in combination to know when the water is pervasive throughout the vehicle 100. In still further arrangements, the sensing module 220 can account for instances when the vehicle is rotated or flipped and thus may define other areas relative to the degree of rotation or inclination. In yet further aspects, the sensing module 220 defines the threshold according to a rate of rising of the water. That is, the threshold may indicate the water is to rise at a rate of 0.5 cm/minute. Accordingly, when the sensing module 220 determines that the water satisfies the threshold, then the sensing module 220 may proceed with additional functions in support of the vehicle 100 and the passengers.

In regards to the detection model 250, consider that the detection model 250, in one configuration, is a machine learning algorithm, such as a convolutional neural network (CNN), a recurrent neural network (RNN), or another deep neural network, which may include a combination of multiple independent neural networks (e.g., both CNNs and RNNs). In any case, the detection model 250 may be integrated with the sensing module 220 and may process the radar data 240 to identify patterns or signatures in the radar data 240 corresponding to different observations, such as the presence of water, the identification of passengers, characteristics of passengers (e.g., breathing, etc.). By way of example, the sensing module 220 acquires the radar data 240 from which the detection model 250 can identify the presence of locations of passengers and the signature of water within the vehicle 100 along with, using subsequent radar data 240 a rate of filling and/or any other movement of the water. In any case, the detection model 250 can process the radar data 240 to identify the noted aspects from which subsequent functionality can be initialized.

It should be appreciated that while the present disclosure generally discusses the use of a machine-learning algorithm to detect the patterns/signatures, in further approaches, other mechanisms for detecting the patterns/signatures may be employed, such as heuristic-based approaches. In response to identifying that the current state satisfies the threshold (i.e., that water is present at a defined height and/or is ingressing at the defined rate), the sensing module 220, in one approach, may further determine whether passengers are present in the vehicle 100. If passengers are not present, then the sensing module 220 may proceed by generating a response (e.g., an alert to an owner) about the water, which may be associated with a flooding event or some other non-emergency threat.

However, when passengers are present in the passenger cabin, as identified according to at least the radar data 240, the sensing module 220 may iteratively acquire additional data about the passengers to monitor the passengers. For example, if the vehicle 100 becomes immediately submerged from a collision or other emergency event, the passengers may be unconscious and thus unable to extricate themselves from the vehicle 100. Thus, the sensing module 220 can monitor the passengers by determining whether the passengers are breathing, tracking a time the vehicle 100 has been submerged, tracking a time the passengers have been submerged, and so on. That is, even though the vehicle 100 may quickly become submerged, air can remain within the passenger cabin for an extended period of time as the air can be trapped. Thus, acquiring this additional information about the passengers can supplement the current state to further inform an emergency responder about the passengers.

Furthermore, the sensing module 220, in one or more arrangements, generates a response to the identification of the ingress of water that can include various actions depending on a current context. For example, the sensing module 220 determines whether the vehicle 100 encountered an emergency event that can include a collision, a disabling event, and an area of high water. The collision is generally a collision by the vehicle 100 with another vehicle or a stationary object while the vehicle 100 is moving. The occurrence of a collision may mean that airbags of the vehicle have deployed and that the passenger(s) is injured and/or unconscious. Thus, the sensing module 220 may adapt a response according to this knowledge by, for example, keeping a window closed in order to maintain air within the passenger cabin for a longer period of time.

A disabling event may simply be a circumstance where the vehicle is no longer mobile and thus susceptible to flooding whereas encountering high water may indicate an attempt by the operator to drive through flowing water or other water that immobilizes the vehicle. Thus, in these circumstances, the passengers are less likely to be injured and/or unconscious and thus may be able to extricate themselves from the vehicle 100. Thus, the sensing module 220 can proceed by unlatching a seatbelt, unlocking a door, opening a window or sun/moon roof, and so on to facilitate egress from the vehicle 100.

Additionally, the sensing module 220 can generate various responses upon identifying the ingress of water. As noted, the sensing module 220 can control various vehicle systems to control a position of windows, control door locks, control safety restraints, and further control other systems of the vehicle, such as HVAC systems to close or open vents, and communication systems to communicate with emergency services and/or other parties that may help with saving passengers of the vehicle 100.

In one configuration, the sensing module 220 generating an alert and transmits the alert to emergency services. Thus, the sensing module 220 may transmit the alert to an emergency dispatching center that can dispatch police and fire rescue to a scene of the vehicle 100, including specialty services, such as dive rescue. As part of the alert communication, the sensing module 220 can provide information about the incident. The information includes, in one arrangement, a number of passengers, a position of passengers within the passenger cabin, characteristics about the passengers, and whether the passenger is seated in a child safety seat. The characteristics may include information about the passenger, such as an age of the passenger, a seat position of the passenger in the vehicle, and a current condition (e.g., whether the passenger is breathing—a respiration rate). The communication can include images of the passengers, and a time the passengers have been in the vehicle 100 while submerged.

Moreover, the alert communication can also include collected vehicle data, that specifics a location of the vehicle 100, a last known speed of the vehicle 100, whether the vehicle 100 encountered a collision, and an angle of entry into the water relative to a roadway or other point of reference. In this way, the monitoring system 170 can function to hasten a response to vehicle 100 and potentially facilitate self-extraction from the vehicle 100 by the passengers.

Figure 3:
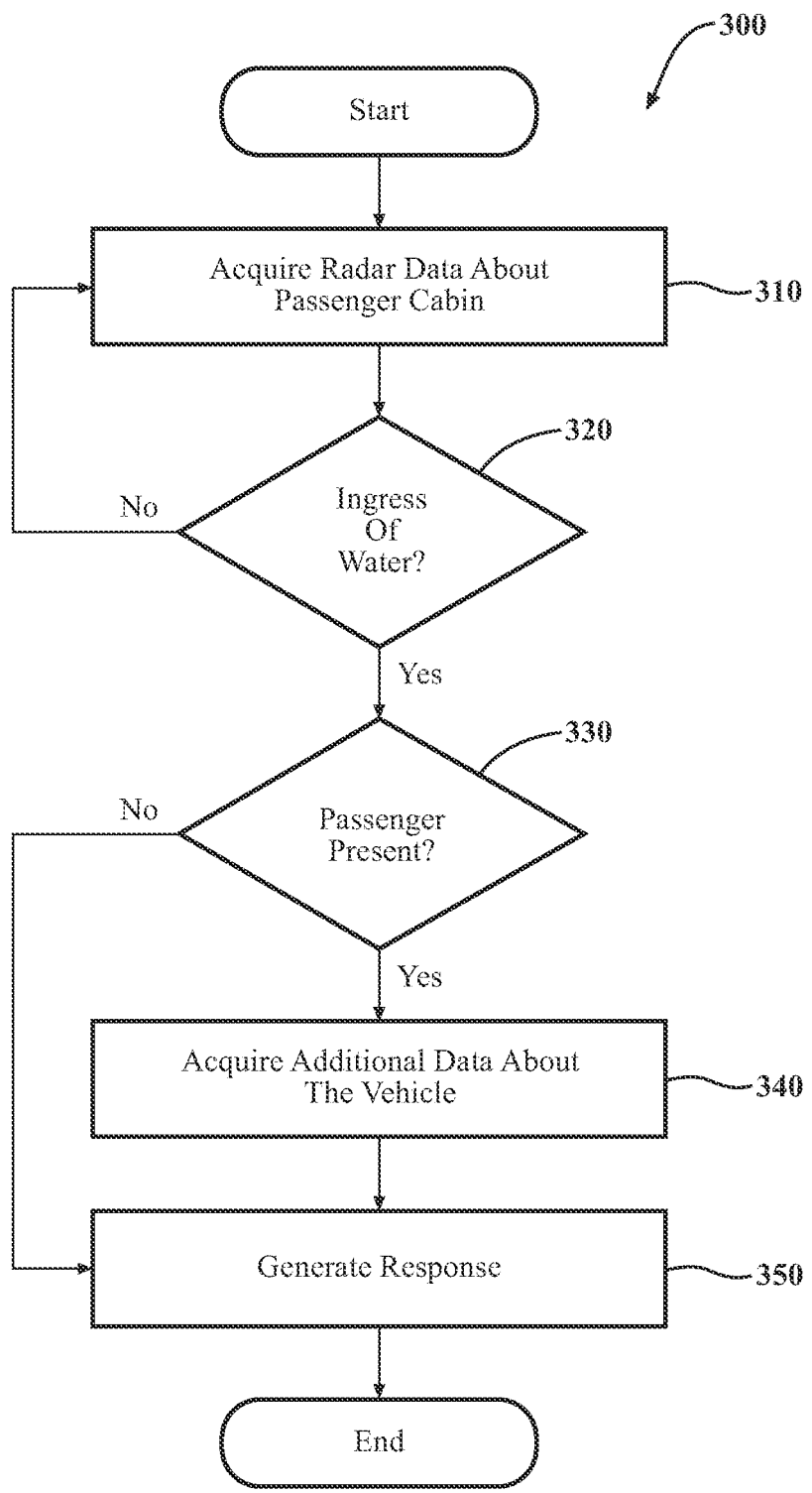
FIG. 3 illustrates a flowchart associated with one embodiment of a method for monitoring a passenger to identify when the passenger is interacting with components within the vehicle.

Additional aspects of improving the safety of passengers within a vehicle by sensing the ingress of water will be discussed in relation to FIG. 3. FIG. 3 illustrates a flowchart of a method 300 that is associated with sensing water ingressing into a vehicle. Method 300 will be discussed from the perspective of the monitoring system 170. While method 300 is discussed in combination with the monitoring system 170, it should be appreciated that the method 300 is not limited to being implemented within the monitoring system 170 but is instead one example of a system that may implement the method 300.

At 310, the sensing module 220 acquires, from the radar 260, the radar data 240 about a passenger cabin of the vehicle 100. As previously noted, the sensing module 220 iteratively acquires the radar data 240 in order to provide a real-time assessment of the interior of the vehicle 100. Accordingly, while the acquisition of the radar data 240 is shown in a serial manner in line with the further functions of method 300, the sensing module 220 may perform the acquisition of the radar data 240 in parallel with one or more of the further disclosed functions.

Moreover, the radar data 240 itself is generally of an area encompassing all seating areas within the vehicle 100, and the radar data 240 may extend to cargo areas, such as within a van or sport utility vehicle (SUV). Thus, the radar data 240 from the radar 260 includes information about passengers and areas around the passengers. As a general trait, the sensing module 220 can use the radar data 240 to distinguish between static and dynamic objects in the passenger cabin, thereby simplifying the identification of movements of a passenger. Moreover, the radar data 240 also includes information about the properties of different objects/materials. Thus, the radar data 240 includes signatures (i.e., specific patterns in the radar data 240) associated with materials when the particular materials are present within an observed space. Accordingly, water and similar materials impart a signature onto the radar data 240 that can be subsequently identified as discussed further subsequently.

At 320, the sensing module 220 determines whether there is an ingress of water into the vehicle 100. In one approach, the sensing module 220 determines the ingress as part of determining a current state of the passenger cabin according to the radar data 240. It should be noted that determining the current state, as used in the present disclosure, generally corresponds with multiple tasks, including, but not limited to determining passenger occupancy and location, determining a context of the vehicle, and sensing the presence of water within the vehicle 100. Thus, at 320, the sensing module 220 processes the radar data 240 to determine several different aspects about the passenger cabin and the vehicle 100 in general that form the current state.

Accordingly, the sensing module 220 analyzes the radar data 240 to determine whether water is presently within the vehicle 100. As noted, the sensing module 220 detects the general presence of water according to a signature of the water that is embodied within the radar data 240. Thus, the sensing module 220 can identify different areas within the passenger cabin where water is present. In general, the detection of the water is in relation to pools or streams of water that are likely present within a floor area of the vehicle 100. As such, to avoid false-positive determinations when identifying water, the sensing module 220, in one arrangement, considers an area of coverage of the water and also a depth. That is, the water that is present in one small area is generally not indicative of an ingress of water that may occur when the vehicle 100 drives into a body of water, such as a lake, river, ocean, or another area where water is sufficiently deep to submerge or at least partially submerge the vehicle 100.

Thus, the sensing module 220 determines an ingress of water when the water is generally pervasive throughout an area of the vehicle 100, such as a front footwell, rear footwell or combinations thereof. Of course, when the vehicle 100 is inverted, the sensing module 220 may consider other locations that generally correspond to a lowest area within the vehicle 100 according to a current orientation. Moreover, the sensing module 220 can determine a depth of the water in the vehicle 100 according to known distances within the vehicle 100 from the radar 260. Furthermore, the sensing module 220 can track the rise of the water in the vehicle 100 over a defined time interval. Using the information from the current state about the ingress of water, the sensing module 220 makes a determination according to a threshold about whether the sensed water is associated with the ingress of water into the vehicle 100 representing an emergency event (i.e., the vehicle 100 has entered a body of water and is becoming submerged) or whether the water is simply from a random source, such as a spill, rain, etc. If the sensing module 220 determines that the water does not meet the threshold, then the sensing module 220 continues to monitor the passenger cabin by repeating the acquisition of the radar data 240 and determination of the current state. However, when the sensed water satisfies the threshold, then the sensing module 220 proceeds with additional determinations at 330.

At 330, the sensing module 220 determines whether a passenger is present within the vehicle 100. In one arrangement, the sensing module 220 determines the presence of the passenger according to the current state. For example, upon acquiring the radar data 240, the sensing module 220 determines the current state, which can include identifying a presence of a passenger and a location of a passenger in the passenger cabin. In one approach, identifying the location of a passenger includes processing the radar data 240 according to a detection model 250 that may cluster, segment, and classify patterns within the radar data 240 having characteristics corresponding with a person being present within the vehicle 100. Moreover, the sensing module 220 may also estimate further aspects about the passenger, including an age of the passenger or at least whether the passenger is a child or an adult. The sensing module 220 may estimate the age of the passenger according to a size of the passenger, and may also consider a seating arrangement in estimating the age. That is, if the passenger is seated in a child safety seat, then the sensing module 220 may conclude that the passenger is a child. In any case, when a passenger is detected, then further information may be acquired about the passenger and/or the vehicle 100, while the sensing module 220 may simply generate a response when no passenger is detected.

At 340, the sensing module 220 acquires additional data about the vehicle 100. For example, the sensing module 220 may acquire additional data from further sensors of the vehicle 100 and/or further analyze the radar data 240 to derive additional determinations. In one approach, the sensing module 220 acquires images of the passengers, a current condition of the passengers, and a time the passenger has been in the vehicle submerged. As used herein, the time submerged in the vehicle 100 generally refers to a time since the ingress of water has been originally detected, but may also refer to a time for which the vehicle 100 itself has been underwater or in water. Thus, the sensing module 220 may further verify various aspects about the passenger that may have been acquired as part of the current state of the vehicle 100. For example, the sensing module 220 may determine a position of a passenger within the passenger cabin, whether the passenger is seated in a child safety seat, whether the passenger is conscious, whether the passenger is breathing, and other characteristics of the passenger, such as an age.

Moreover, it should be appreciated that the sensing module 220 can acquire and/or determine further information about the vehicle 100 and the circumstances surrounding the ingress of the water. That is, the sensing module 220 can determine whether the vehicle 100 encountered an emergency event, including a collision, a disabling event (e.g., mechanical breakdown), and an area of high water (e.g., driving into a roadway covered with water or into a lake/pond/river/etc.). In yet a further aspect, the sensing module 220 determines when the vehicle 100 enters water resulting from an emergency event and whether the vehicle 100 is itself submerged and a time that the vehicle 100 has been submerged underwater. For example, the sensing module 220 can use information from an inertial measurement unit (IMU) and/or further telematics data to identify patterns corresponding with a collision, abrupt stop, failure of mechanical systems, and so on that generally correspond with such an event. This information can be combined with further vehicle data that the sensing module 220 collects, such as a location of the vehicle 100, a last known speed of the vehicle 100, and an angle of entry into the water (e.g., relative to a roadway or other known point of reference), in order to provide additional contextual information for a response to the event. As such, the sensing module 220, in one arrangement, can use the contextual information, such as knowledge about a last known location and angle or movement from the roadway to identify a body of water in which the vehicle 100 may be submerged while also providing other information as discussed at 350.

At 350, the sensing module 220 generates a response to the ingress of the water. As previously highlighted, the sensing module 220 can generate a wide range of responses that include simply transmitting a message to a vehicle owner when the vehicle 100 is empty up to activating various vehicle systems in order to facilitate passengers escaping the vehicle 100. For example, in one approach, the sensing module 220 generates the response by communicating vehicle data to an emergency service that identifies aspects, such as a number of passengers in the vehicle 100 and characteristics of the passengers. In further aspects, the sensing module 220 unlocks a door of the vehicle, unlatches a seatbelt of the passenger, opens a window of the vehicle 100, and so on. In this way, the monitoring system 170 can expedite an appropriate response to the vehicle 100 while also attempting to remedy the emergency by helping passengers to escape.

Figure 4:
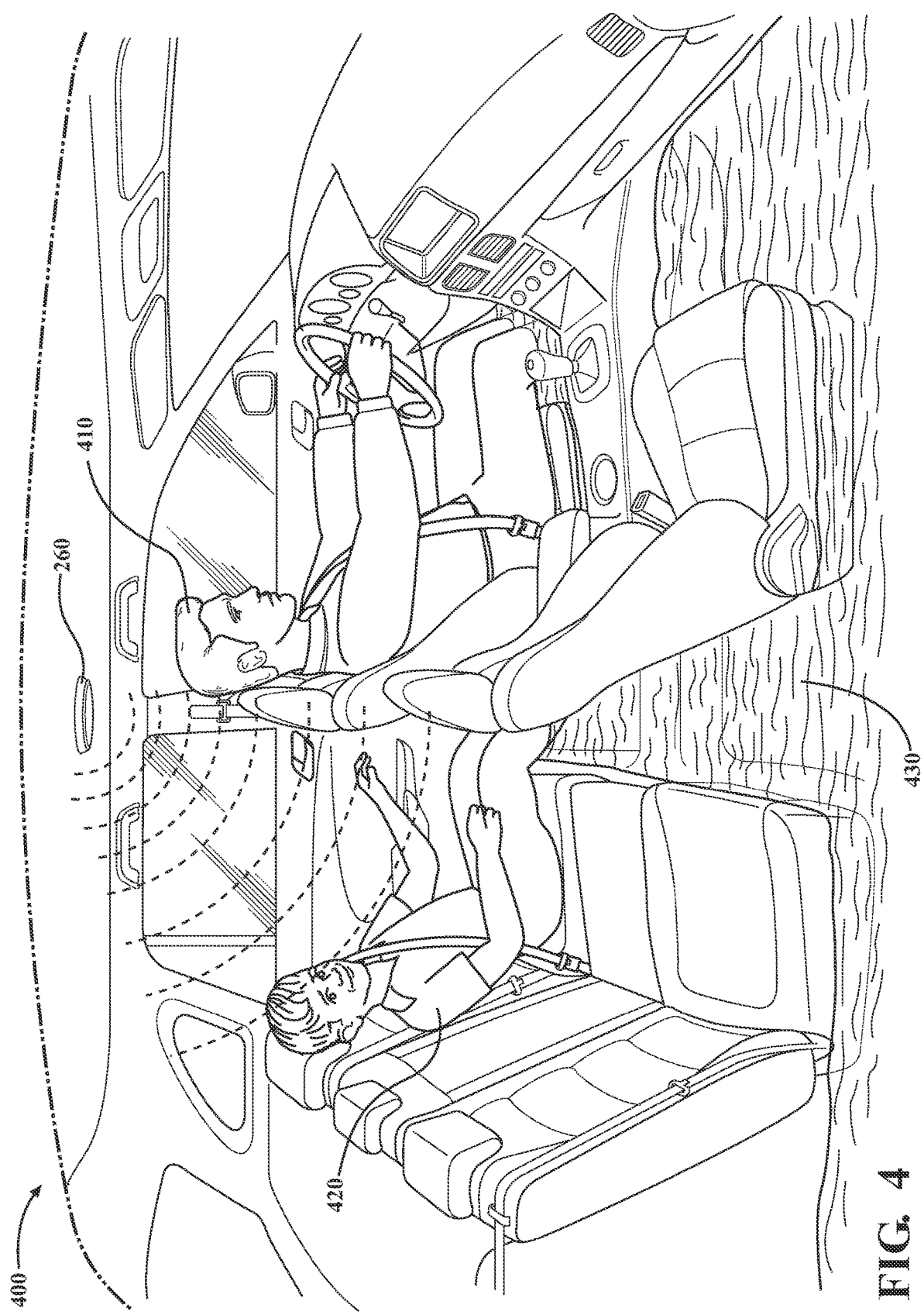
FIG. 4 is an illustration depicting the ingress of water into a vehicle.

With reference to FIGS. 4-5, additional examples of how the monitoring system 170 functions to improve the safety of the passengers will be described. FIG. 4 illustrates a passenger cabin from a view 400. As shown in view 400, a passenger 410 is in a front seat and a passenger 420 is in a rear seat with both wearing seatbelts. Thus, the monitoring system 170 identifies the seating positions of the passengers 410/420 and further identifies characteristics/a current condition. For example, the monitoring system 170 uses the radar data 240 to identify positions but also can estimate an age (e.g., adult vs. child). In still further aspects, the monitoring system 170 determines whether the passengers are conscious, are breathing, and so on. In any case, the monitoring system 170 also identifies the ingress of water 430 that is shown at roughly a seat level in the vehicle 100. Thus, the presence of the water 430 is sufficiently high to trigger the threshold, and the presence of the passengers 410/420 further satisfies the threshold such that the monitoring system 170 generates a response by controlling the vehicle 100 to communicate information about the passengers and the vehicle 100 to an emergency service. The monitoring system 170 may also open the windows, unlatch the seatbelts, or perform other actions to facilitate egress of the passengers 410/420.

With reference to FIG. 5, a view 500 of a passenger cabin of the vehicle 100 is shown. In the instant example, a child 510 is present in a rear seat. The monitoring system 170 identifies the location of the child 510 and further identifies that the child is breathing but not otherwise moving or showing signs of being conscious. Moreover, the monitoring system 170 may have previously opened the windows to permit a front seat passenger to exit, but the child 510 remains. Thus, the water 520 triggered the threshold of the monitoring system 170 such that the water 520 is at a sufficient height along with the presence of the passenger 510 to trigger a response. The response, in the instant case, may be that the monitoring system 170 continues to acquire information about the passenger 510 and provide communications including the information to emergency services in order to facilitate a rescue. In this way, the monitoring system 170 can improve the safety of passengers within the vehicle 100 upon encountering the ingress of water.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed. The braking system 142 may further embody an anti-lock braking system (ABS) that generally functions to prevent tires of the vehicle 100 from sliding during a braking maneuver. That is, the ABS functions to detect wheel slip and adjusts braking to prevent the wheel slip, thereby generally improving braking distances in various conditions. Moreover, the braking system 142 and/or the autonomous driving module 160 may include an electronic stability control (ESC) system that functions to selectively brake individual wheels of the vehicle 100 to maintain overall vehicle stability.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the monitoring system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the monitoring system 170, and/or the autonomous driving module(s) 160 may control some or all of these vehicle systems 140 and, thus, may be partially or fully autonomous.

The processor(s) 110, the monitoring system 170, and/or the autonomous driving module(s) 160 can be operatively connected to communicate with the various vehicle systems 140 and/or individual components thereof. For example, returning to FIG. 1, the processor(s) 110, the monitoring system 170, and/or the autonomous driving module(s) 160 can be in communication to send and/or receive information from the various vehicle systems 140 to control the movement, speed, maneuvering, heading, direction, etc. of the vehicle 100. The processor(s) 110, the monitoring system 170, and/or the autonomous driving module(s) 160 may control some or all of these vehicle systems 140.

The processor(s) 110, the monitoring system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the monitoring system 170, and/or the autonomous driving module(s) 160 can control the direction and/or speed of the vehicle 100. The processor(s) 110, the monitoring system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the monitoring system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "non-transitory computer-readable medium" means a physical storage medium that is capable of interfacing and control by a computer. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A monitoring system for improving safety of passengers by sensing an ingress of water into a vehicle, comprising:
   a processor; and
   a memory storing instructions that, when executed by the processor, cause the processor to:
   acquire, from a radar of the vehicle, radar data about a passenger cabin of the vehicle;
   determine a current state of the passenger cabin according to the radar data, including determining a height of water in the passenger cabin when present according to the radar data by identifying a presence of the water according to a signature embodied in the radar data and an extent of coverage of the water within the passenger cabin, the signature indicating a difference in density of a volume of the passenger cabin; and responsive to identifying that the current state indicates an ingress of the water into the passenger cabin, generate a response to the ingress of the water.

2. The monitoring system of claim 1, wherein the instructions to determine the current state include instructions to analyze the radar data according to a detection model that identifies when at least a portion of the passenger cabin is submerged in water.

3. The monitoring system of claim 1, wherein the instructions to determine the current state include instructions to determine whether the vehicle encountered an emergency event, including one of: a collision, a disabling event, and an area of high water, and wherein the instructions to identify that the current state indicates an ingress of water into the passenger cabin include instructions to determine whether the vehicle is submerged and a time that the vehicle has been submerged.

4. The monitoring system of claim 1, wherein the instructions to determine the current state include instructions to identify a position of a passenger within the passenger cabin from the radar data, including determining characteristics about the passenger and whether the passenger is seated in a child safety seat, and wherein the characteristics about the passenger include an age of the passenger, and a seat position of the passenger in the vehicle.

5. The monitoring system of claim 1, wherein the instructions to generate the response include instructions to acquire additional data about the vehicle including acquiring images of a passenger, a current condition of the passenger, and a time the passenger has been in the vehicle submerged, wherein the instructions to generate the response include instructions to control a vehicle system, including transmitting an alert to a vehicle owner, communicating vehicle data to an emergency service that identifies a number of passengers in the vehicle and characteristics of the passengers indicating at least a position of the passengers in the vehicle, unlocking a door of the vehicle, unlatching a seatbelt of the passenger, and opening a window of the vehicle.

6. The monitoring system of claim 1, wherein the instructions to determine the current state include instructions to collect vehicle data, including at least one of: a location of the vehicle, a last known speed of the vehicle, whether the vehicle encountered a collision, and an angle of entry into the water, and wherein the instructions to generate the response include instructions to transmit the vehicle data to an emergency service.

7. The monitoring system of claim 1, wherein the radar is one of a millimeter-wave (MMW) radar, and an ultra-wideband (UWB) radar.

8. A non-transitory computer-readable medium comprising instructions that, when executed by one or more processors, cause the one or more processors to:

acquire, from a radar of a vehicle, radar data about a passenger cabin of the vehicle;

determine a current state of the passenger cabin according to the radar data, including determining a height of water in the passenger cabin when present according to the radar data by identifying a presence of the water according to a signature embodied in the radar data and an extent of coverage of the water within the passenger cabin, the signature indicating a difference in density of a volume of the passenger cabin; and responsive to identifying that the current state indicates an ingress of the water into the passenger cabin, generate a response to the ingress of the water.

9. The non-transitory computer-readable medium of claim 8, wherein the instructions to determine the current state include instructions to analyze the radar data according to a detection model that identifies when at least a portion of the passenger cabin is submerged in water.

10. The non-transitory computer-readable medium of claim 8, wherein the instructions to determine the current state include instructions to determine whether the vehicle encountered an emergency event, including one of: a collision, a disabling event, and an area of high water, and wherein the instructions to identify that the current state indicates an ingress of water into the passenger cabin include instructions to determine whether the vehicle is submerged and a time that the vehicle has been submerged.

11. The non-transitory computer-readable medium of claim 8, wherein the instructions to determine the current state include instructions to identify a position of a passenger within the passenger cabin from the radar data, including determining characteristics about the passenger and whether the passenger is seated in a child safety seat, and wherein the characteristics about the passenger include an age of the passenger, and a seat position of the passenger in the vehicle.

12. A method, comprising:

acquiring, from a radar of a vehicle, radar data about a passenger cabin of the vehicle;

determining a current state of the passenger cabin according to the radar data, including determining a height of water in the passenger cabin when present according to the radar data by identifying a presence of the water according to a signature embodied in the radar data and an extent of coverage of the water within the passenger cabin, the signature indicating a difference in density of a volume of the passenger cabin; and responsive to identifying that the current state indicates an ingress of the water into the passenger cabin, generating a response to the ingress of the water.

13. The method of claim 12, wherein determining the current state includes analyzing the radar data according to a detection model that identifies when at least a portion of the passenger cabin is submerged in water.

14. The method of claim 12, wherein determining the current state includes determining whether the vehicle encountered an emergency event, including one of: a collision, a disabling event, and an area of high water, and wherein identifying that the current state indicates an ingress of water into the passenger cabin includes determining whether the vehicle is submerged and a time that the vehicle has been submerged.

15. The method of claim 12, wherein determining the current state includes identifying a position of a passenger within the passenger cabin from the radar data, including determining characteristics about the passenger and whether the passenger is seated in a child safety seat, and wherein the characteristics about the passenger include an age of the passenger, and a seat position of the passenger in the vehicle.

16. The method of claim 12, wherein generating the response includes acquiring additional data about the vehicle including acquiring images of a passenger, a current condition of the passenger, and a time the passenger has been in the vehicle submerged, wherein generating the response includes controlling a vehicle system, including transmitting an alert to a vehicle owner, communicating vehicle data to an emergency service that identifies a number of passengers in the vehicle and characteristics of the passengers indicating at least a position of the passengers in the vehicle, unlocking a door of the vehicle, unlatching a seatbelt of the passenger, and opening a window of the vehicle.

17. The method of claim 12, wherein determining the current state includes collecting vehicle data, including at least one of: a location of the vehicle, a last known speed of the vehicle, whether the vehicle encountered a collision, and an angle of entry into the water, and wherein generating the response includes transmitting the vehicle data to an emergency service.

* * * * *